United States Patent [19]
DeMars et al.

[11] Patent Number: 5,803,471
[45] Date of Patent: Sep. 8, 1998

[54] COLLAPSIBLE DOLLY

[76] Inventors: Robert A. DeMars, 5000 N. Parkway Calabasas, Suite 233, Calabasas, Calif. 91302; Jack B. Cline, 12827 Bromwich St., Arleta, Calif. 91331

[21] Appl. No.: 862,655

[22] Filed: May 23, 1997

[51] Int. Cl.$^6$ ...................................................... B62B 1/04
[52] U.S. Cl. .............................. 280/40; 280/42; 280/652; 280/655; 280/47.29
[58] Field of Search ................................ 280/40, 42, 651, 280/652, 654, 655, 47.27, 47.28, 47.29

[56] References Cited

U.S. PATENT DOCUMENTS

| | | | |
|---|---|---|---|
| 4,754,985 | 7/1988 | Im et al. | 280/40 |
| 4,969,660 | 11/1990 | Spak | 280/646 |
| 4,993,727 | 2/1991 | vom Braucke et al. | 280/40 |
| 5,312,006 | 5/1994 | Lag | 211/195 |
| 5,348,325 | 9/1994 | Abrams | 280/40 |
| 5,468,005 | 11/1995 | Yang | 280/40 |

Primary Examiner—Richard M. Camby
Attorney, Agent, or Firm—Jack C. Munro

[57] ABSTRACT

The subject invention is a lightweight, foldable, collapsible dolly which is to be used to move exterior heavy objects from one locale to another that is capable of being folded to a substantially shortened, flat arrangement facilitating storage in confined quarter locations such as beneath the seat or within an overhead bin of an airplane or train. The collapsible dolly includes a pair of wheels, each of which is movable from the flat arrangement to a transverse position relative to the support frame of the collapsible dolly. With the wheels located in the flat arrangement, the dolly can be rolled by the wheels on a supporting surface. The moving of the wheels into the transverse position occurs automatically during movement of the platform from its stowage position to an outwardly extended position which is the loading position of the platform. A handle unit is to be extendable from the support frame by the actuation of a single actuation device which then permits the handle unit to be moved to extended positions. With the handle unit in any position, the dolly is conveniently wheelable by a human when either in the collapsed or using position.

12 Claims, 3 Drawing Sheets

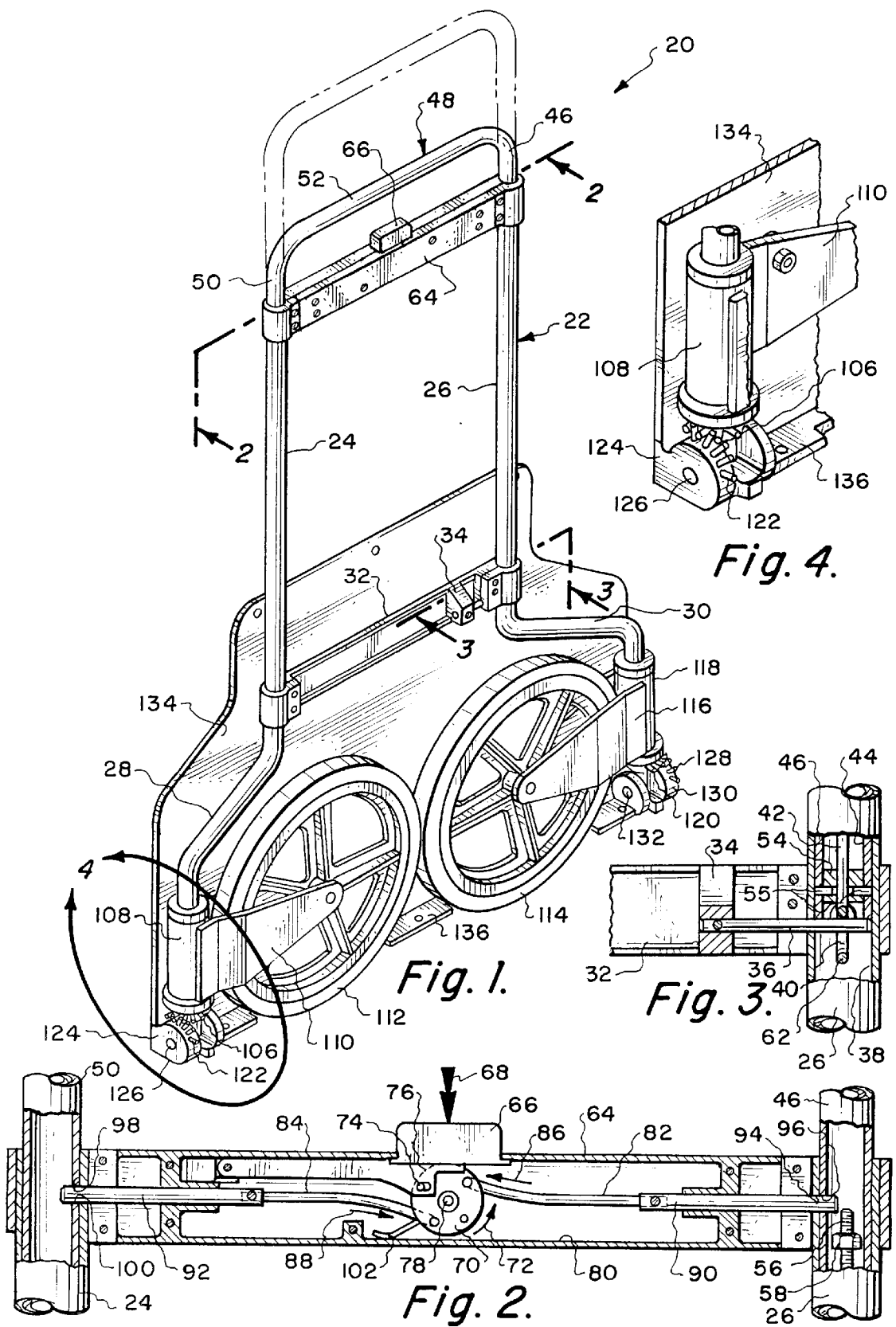

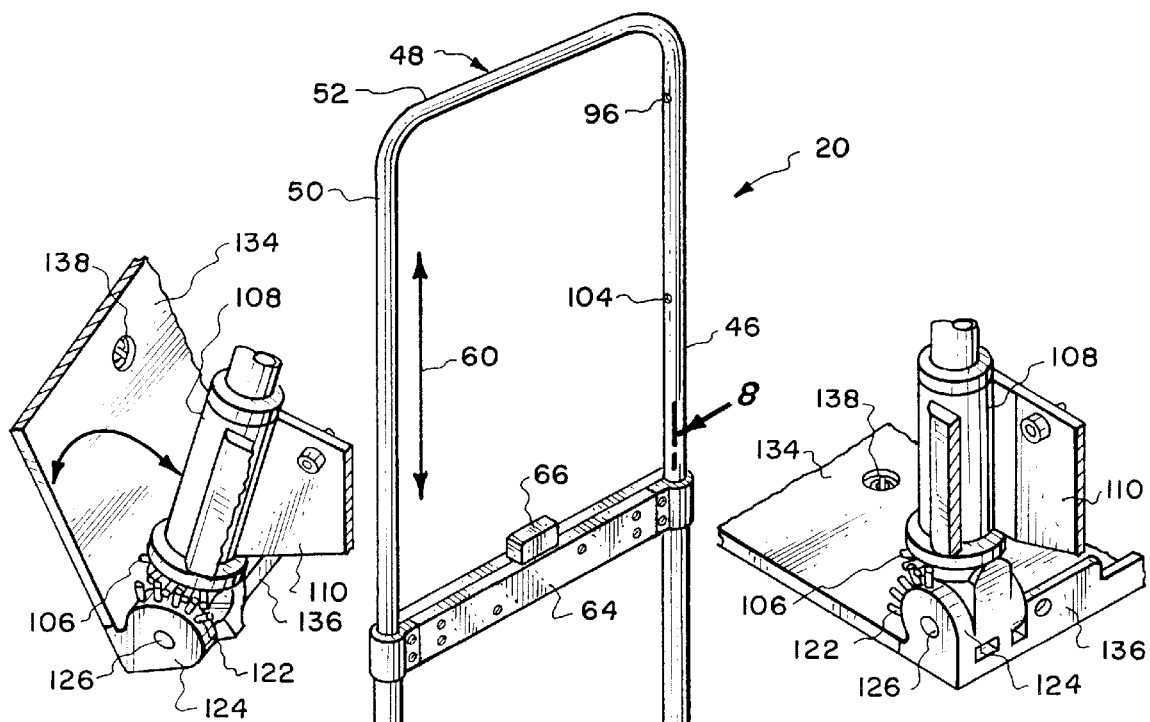
Fig. 5.
Fig. 6.
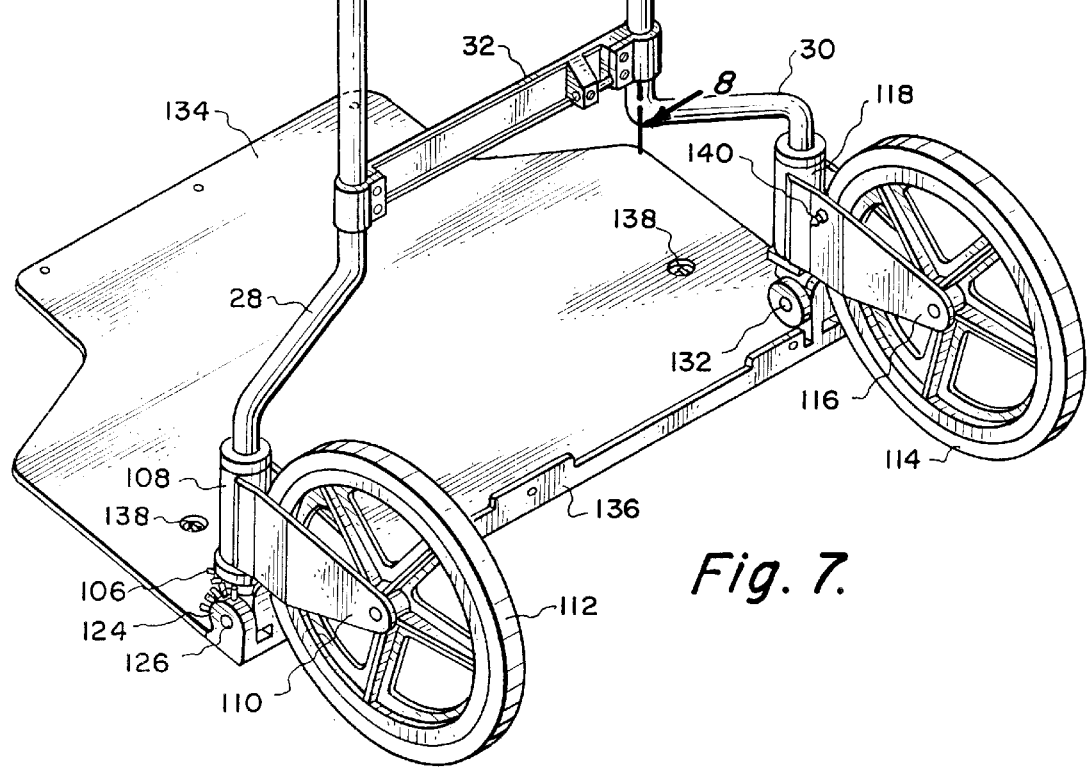
Fig. 7.

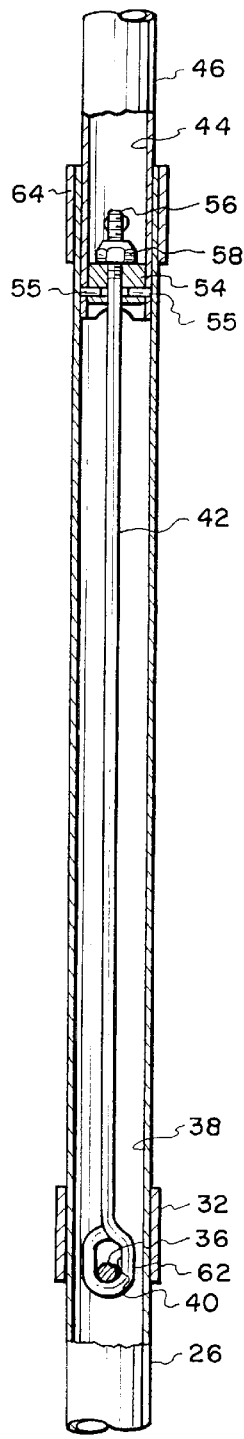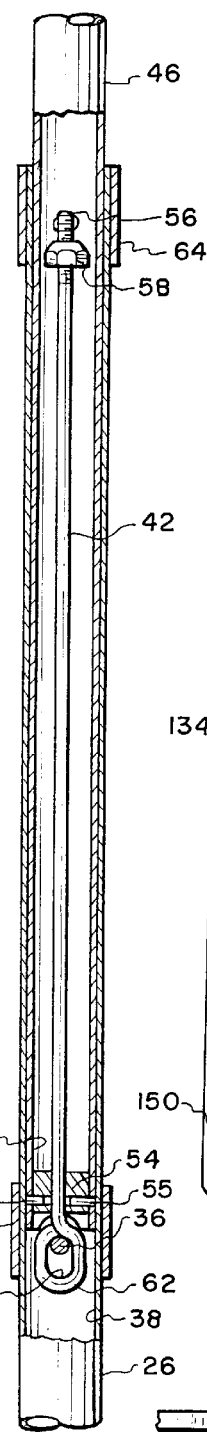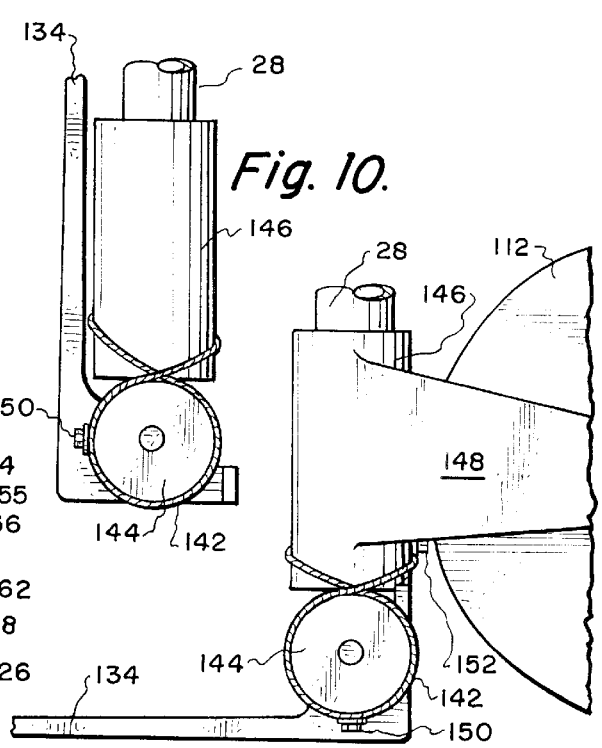
Fig. 8.  Fig. 9.  Fig. 10.  Fig. 11.

COLLAPSIBLE DOLLY

BACKGROUND OF THE INVENTION

1) Field of the Invention

The field of this invention relates to a two-wheeled dolly, and more particularly to a two-wheeled dolly that is light in weight and can be readily collapsed into a small sized unit which is readily stowable within confined storage areas.

2) Description of the Prior Art

A collapsible dolly, which is commonly referred to as a hand truck, is in exceedingly common use by travelers. The travelers use the collapsible dolly to support luggage and to transport the luggage when moving around such areas as train stations, bus stations and airports. Such hand trucks of the prior art have certain drawbacks. One of the drawbacks is that the hand truck is normally not constructed to handle any significant amount of weight and as such are intended only to be used in conjunction with luggage. There is a need to construct a collapsible dolly which accommodates objects weighing more than the average filled luggage. It is also desirable that such a dolly be folded in the same manner as the hand truck that is designed for luggage and, when folded, to occupy about the same space as the folded hand truck. Another drawback of prior art hand trucks is that such require many separate steps to move the hand truck from a collapsed position to the using position.

In the past, the procedure for collapsing and then expanding collapsible hand trucks has required a plurality of movements. Each collapsible hand truck has a load carrying platform, a pair of wheels, a frame and one or two handles. In order to extend the handle, wheels and platform relative to the support frame, generally several different locking devices are to be disengaged which then permits the handle, wheels and platform to be extended. When it is desired to collapse the handle and fold the wheels and platform, the same locking devices need to be individually activated in order for the handle to be retracted. Frequently, the support platform then needs to be moved separately from the wheels. It is desirable to minimize the series of movements in collapsing and expanding of a collapsible dolly.

SUMMARY OF THE INVENTION

The principal object of the present invention is to provide a collapsible dolly which can, with fewer steps and simpler movements, be brought in a simple manner from the collapsed position to a using position, and vice versa.

Another objective of the present invention is to provide a handle adjustable to several different lengths from the platform to accommodate different heights of dolly operators or different load heights.

Another objective of the present invention is to construct a hand truck that when in the collapsed position the lower part of the two wheels extends below the platform so the unit can be wheeled along on the wheels instead of having to carry it.

Another objective of the present invention is to construct a collapsible dolly which is stronger than prior art hand trucks permitting the carrying of more weight and larger objects yet is of lightweight construction and can be manufactured economically.

The collapsible dolly of this invention is constructed resembling in appearance a conventional collapsible dolly. The collapsible dolly includes a support frame. Mounted on the lower end of the support frame is a pair of wheels with the wheels being located in a spaced-apart relationship and which, when folded, extend below the platform edge to eliminate carrying. Also mounted on the lower end of the support frame is a support platform. The support platform is to be movable between a loading position and a stowage position with the stowage position being located directly adjacent the support frame and the loading position being located in an outwardly extending position relative to the support frame. Each of the wheels includes a series of first short pins located in an arcuate arrangement. Each series of first short pins is to interengage with a series of second short pins which are mounted on and move with the platform with it being understood that there are two separate series of second short pins. Movement of the platform between the loading position and the stowage position will automatically result in movement of the wheels between a usage position and a folded position. A handle is telescopically mounted in the lower support frame. A single actuation button is mounted on the support frame and when manually pressed causes disengagement of a locking arrangement that will disengage the handle unit so that it can be moved to a fully extended or several intermediate positions relative to the support frame. Internally of the handle unit there is located a stop that limits the extent of the movement of the handle unit relative to the support frame. The short pin interengagement arrangement could be interchanged with a cable connection between each wheel and the support platform.

BRIEF DESCRIPTION OF THE DRAWINGS

FIG. 1 is an isometric view of the collapsible dolly of the present invention showing the collapsible dolly in the collapsed position;

FIG. 2 is a cross-sectional view of the locking arrangement for fixing in position the extendable handle relative to the support frame within the collapsible dolly of this invention taken along line 2—2 of FIG. 1;

FIG. 3 is a cross-sectional view through the lower portion of the support frame of the collapsible dolly of this invention taken along line 3—3 of FIG. 1;

FIG. 4 is an isometric view of a portion of the collapsible dolly of this invention taken along line 4—4 of FIG. 1 showing more clearly the interconnection arrangement between the platform and a wheel assembly with the collapsible dolly in the collapsed position;

FIG. 5 is a view similar to FIG. 4 but showing the platform being moved from the stowage position toward the loading position which also results in the wheel assembly being moved from the folded position to the usage position;

FIG. 6 is a view similar to FIG. 5 but with the platform in the loading position and the wheel assembly in the usage position;

FIG. 7 is an isometric view of the collapsible dolly of this invention showing the collapsible dolly in the fully extended position of normal usage;

FIG. 8 is a cross-sectional view taken through the handle unit of the collapsible dolly of this invention taken along line 8—8 of FIG. 7 showing the handle unit in the extended position;

FIG. 9 is a view similar to FIG. 8 but with the handle unit in the retracted position;

FIG. 10 is a side elevational view of a wheel assembly and platform of a modified form of interconnection arrangement between the platform and the wheel assembly showing the platform in the stowage position; and FIG. 11 is a view similar to FIG. 10 but showing the platform in the loading position and the wheel assembly in the usage position.

DETAILED DESCRIPTION OF THE PREFERRED EMBODIMENT

Referring particularly to the drawings, there is shown the collapsible dolly 20 of this invention. The main component of the collapsible dolly 20 is a support frame 22. The support frame 22 is constructed of a left tubular member 24 and a right tubular member 26. The upper portion of the left tubular member 24 is parallel to the right tubular member 26 and is spaced therefrom. The lower portion of the left tubular member 24 is flared outwardly forming an outwardly flared section 28. In a similar manner, the lower portion of the right tubular member 26 is flared outwardly forming an outwardly flared section 30. The left tubular member 24 and the right tubular member 26 are both of the same diameter with generally about an inch in diameter currently preferred. It is to be understood that the both the left tubular member 24 and the right tubular member 26 are basically hollow.

Fixedly connected to and located between the left tubular member 24 and the right tubular member 26 is a transverse support member 32. The transverse support member 32 is located directly adjacent the outwardly flared sections 28 and 30. The transverse support member 32 includes a protrusion 34. Mounted within the protrusion 34 is a pin 36. The pin 36 is fixed to the protrusion 34. The pin 36 extends within the right tubular member 26 and terminates within the hollow interior chamber 38 of the right tubular member 26. The pin 36 is to be mounted within oversized hole 40 of loop section 62 formed within rod 42. The rod 42 is to be located within the hollow interior chamber 38. Mounted within the hollow interior chamber 38 in a telescoping manner is the right segment 46 of a handle unit 48. The handle unit 48 also includes a left segment 50 which is telescopically installed within the left tubular member 24. Interconnecting the right segment 46 and the left segment 50 is an apex segment member 52. The right segment 46 includes a hollow interior chamber 44. Fixedly mounted by a pair of locking pins 55 within the hollow interior chamber 44 and located at the lower free end of the right segment 46 is a block 54. The rod 42 passes through the block 54 with the threaded end 56 of the rod 42 being threadably secured to a conventional fastener nut 58 which forms an abutment.

The handle unit 48 can be telescopically moved from the retracted solid line position shown in FIG. 1 in the direction of arrow 60 to the solid line extended position shown in FIG. 7. When in the position shown in FIGS. 1 and 3, which is the retracted position, the block 54 is located directly adjacent the loop section 62 within which is formed the oversized hole 40. When the handle unit 48 is located in the extended position, as is shown in solid lines in FIG. 7, the block 54 is located directly against the fastener nut 58. Therefore, the fastener nut 58 functions as a movement limiter (stop) which prevents the handle unit 48 from disengaging from the support frame 22. With the handle unit 48 in the extended position, as shown in FIG. 7, this would be the customary using position for the collapsible dolly 20 of this invention. With the handle unit 48 in the retracted position, as shown in FIG. 1, this would be the customary stowage position for the collapsible dolly of this invention.

Also mounted between the left tubular member 24 and the right tubular member 26 is a crossbar 64. One end of the crossbar 64 is affixed to the left tubular member 24 and the opposite end of the crossbar 64 is fixedly secured to the right tubular member 26. The crossbar 64 is basically parallel to the transverse support member 32 with the crossbar 64 being located directly adjacent the upper end of the tubular members 22 and 24. Centrally mounted within the crossbar 64 is a button 66. The button 66 is to be deflectable in the direction of arrow 68. Deflecting of the button 66 in the direction of arrow 68 will cause wheel 70 to pivot in the direction of arrow 72. A pin 74 is mounted on the wheel 70 with this pin 74 being connected to extension 76. Extension 76 is integral to the button 66. Location of the pin 74 is off-center from the wheel axis 78. The wheel 70 is mounted within the interior chamber 80 of the crossbar 64.

Connected to the wheel 70 is a pair of rods 82 and 84. When the wheel 70 is pivoted in the direction of arrow 72, the rod 82 is moved in the direction of arrow 86 and the rod 84 is moved in the direction of arrow 88. The outer end of rod 82 is attached to a locking pin 90. The outer end of rod 84 is attached to a locking pin 92. The locking pin 90 is conducted through a hole 94 formed within the right tubular member 26 and then through an aligned hole 96 formed within the right segment 46. In a similar manner, the locking pin 92 extends through a hole 98 formed within the left tubular member 24 and then the locking pin 92 is to extend through a hole 100 with which it is aligned with the hole 100 being formed within the left segment 50.

A spring 102 connects with the wheel 70. The spring 102 exerts a continuous bias on the wheel 70 tending to position the locking pins 90 and 92 in the locking position shown in FIG. 2 of the drawings. It is to be noted that the right segment 46 not only includes the hole 96 but an intermediate hole 104, as well as a lower hole (not shown). Similar such holes are formed within the left segment 50. With the locking pins 90 and 92 being connecting with the lower holes of the segments 46 and 50, the handle unit 48 is in the position shown in FIG. 7 and is lockingly connected to the support frame 22. Pushing of the button 66 will disengage the locking pins 90 and 92 which will then permit the handle unit 48 to be telescopically moved relative the support frame 22 so that the locking pins 90 and 92 can either engage with the intermediate holes 104 (only one being shown) or engage with the holes 96 and 100. The holes 96 and 100 locate the handle unit 48 in the fully telescoped or collapsed position which is shown in FIG. 1.

When using the collapsible dolly 20 of this invention, the handle unit 48 would generally be in the extended position which is shown in FIG. 7. However, for certain low loads or individuals that are short in stature, it may be more comfortable for the handle unit 48 to be locked in the position where the locking pins 90 and 92 will engage with the intermediate position holes 104. Also, the intermediate holes 104 are used when the dolly is collapsed and rolled on the supporting surface.

Located at the lower outer free end of the outwardly flared section 28 is an arcuate series of a plurality of short pins 106. For reference purposes, let it be said that these short pins are arranged in a horizontal pattern. The pins 106 are all of the same length and are located within a segment of a circle. The short pins 106 are mounted directly onto the sleeve 108. The sleeve 108 is pivotable on the lower end of the outwardly flared section 28. Fixedly mounted to the sleeve 108 is a bifurcated mounting bracket 110. Mounted to the outer end of the bifurcated mounting bracket 110 is a rotatable load bearing wheel 112.

In a similar manner, there is a wheel 114 which is rotatably mounted to a bifurcated mounting bracket 116. The bifurcated mounting bracket 116 is fixedly secured to a sleeve 118. The sleeve 118 is rotatably mounted on the lower end of the outwardly flared section 30. The lower end of outwardly flared section 30 terminates in a horizontally arranged, arcuate series of short pins 120. The short pins 120 are fixedly mounted onto the sleeve 118.

The short pins 106 are in continuous engagement with a vertical arrangement of an arcuate series of short pins 122. The short pins 122 are fixedly mounted onto a mount 124 which is mounted on and pivots with the platform 134. Pivoting of the pivot mount 124 is about the pivot axis 126. In a similar manner, the horizontal short pins 120 are in continuous engagement with a vertical arrangement of short pins 128 which are mounted on a mount 130. Mount 130 is mounted on and pivots with platform 134 and contains the pivot axis 132.

The platform 134 can be located in a stowage position which is shown in FIG. 1. The stowage position of the platform 134 locates the platform 134 in juxtaposition to the support frame 22. The platform 134 can also be pivoted to a loading position which is shown in FIG. 7 which locates the platform 134 substantially perpendicular to its position shown in FIG. 1. This pivoting of the platform 134 is permitted by means of the pivot axes 126 and 132. As the platform 134 is pivoted to the loading position shown in FIG. 7, sleeves 108 and 118 are each rotated ninety degrees which is caused by the interconnection of the short pins 106 and 120 respectively with the short pins 122 and 128. This will rotate and locate the wheels 112 and 114 in the usage position which is shown in FIG. 7.

It is desirable for the rear edge of the platform 134 to have an upwardly extending flange 136. The purpose of the flange 136 is to prevent an object that is placed on the platform 134 from sliding off the platform 134 when the collapsible dolly 20 of this invention is tilted to its inclined position and then rolled on a supporting surface by means of the wheels 112 and 114. Also, when the platform 134 is in the stowage position, as shown in FIG. 1, it is desirable that the platform 134 be somewhat locked in position. In order to achieve this, there is formed a pair of holes 138 within the platform 134. A threaded fastener 140 is mounted on the inside of the bifurcated bracket 116 and a separate threaded fastener 140 is mounted on the inside of the bifurcated bracket 110. With the wheels 112 and 114 in the stowage position, each fastener 140 is to be located within a separate hole 138 and be located therein in a snug fit relationship. Holes 138 are formed in platform 134. Each fastener 140 is snugly engaged with a spring clip (not shown) mounted directly adjacent its respective hole 138 thereby forming a lock to tend to hold in position the platform 134 when in the stowage position thereby preventing accidental movement of the platform 138 from the stowage position to the loading position except when it is desired to actually achieve that movement manually. When in the stowage position, the dolly 20 can be rolled by wheels 112 and 114 on a supporting surface eliminating the need to carry the dolly 20. The rolling of wheels 112 and 114 is permitted since such extend below the flange 136.

Referring particularly to FIGS. 10 and 11 of the drawings, there is shown a modified version of a structure that could be employed to interconnect the wheels 112 and 114 with the platform 134 so that as the platform 134 is moved, the wheels 112 and 114 are also being moved. This structure in FIGS. 10 and 11 is shown only in relation to the wheel 112, but it is to be understood that a similar type of structure will be utilized in conjunction with wheel 114. Instead of the interconnecting short pins 106 and 122 and also 120 and 128, a cable 142 is wound about a circular shaped pivot mount 144 which is basically similar to the pivot mount 124. The cable 142 is crossed and then extends around the sleeve 146 which is basically similar to the sleeve 108. The sleeve 146 has a bifurcated bracket 148 fixedly mounted thereon onto which is rotatably mounted the wheel 112.

The cable 142 is fixedly mounted by fastener 150 to the pivot mount 144. The cable 142 is also fixedly mounted by a fastener 152 to the sleeve 146. Pivoting of platform 134 and mount 144 ninety degrees will also result in a ninety degree pivoting of the sleeve 146 by the interconnection of the sleeve 146 with the cable 142. As a result, the wheels 112 and 114 are pivoted to the usage position in precisely the same manner by the cables 142 as by the pins when the platform 134 is moved to its loading position as shown in FIG. 7.

What is claimed is:

1. A collapsible dolly comprising:

a support frame formed of a pair of elongated frame members located in a spaced-apart relationship, said support frame defining a plane, said frame members having a lower end and an upper end;

a wheel assembly mounted on said support frame at said lower end, said wheel assembly being pivotally movable between a folded position and a usage position, said folded position being when said wheel assembly is located in juxtaposition with said plane, said usage position being when said wheel assembly is located transverse to said plane, said wheel assembly having a plurality of first short pins located in a circular arc arrangement; and a platform mounted on said support frame at said lower end, said platform being pivotable between an loading position and a stowage position, said loading position being adapted to support an exterior weight, said loading position locating said platform transverse to said plane, said stowage position locating said platform parallel to said plane, said platform including a plurality of second short pins located in a circular arc arrangement, said second short pins being continuously engaged with said first short pins, whereby during movement of said platform from said loading position to said stowage position said wheel assembly is automatically moved from said usage position to said folded position by the engagement between said first short pins and said second short pins.

2. The collapsible dolly as defined in claim 1 including:

a handle unit mounted on said support frame at said upper end, said handle unit being telescopically movable relative to said support frame between an extended position and a retracted position, lock means to fix said handle unit to said support frame when said handle unit is in said extended position or in said retracted position, a single actuation device to cause said lock means to be disengaged, actuation of said actuation device permits said handle unit to be moved between said retracted position and said extended position.

3. The collapsible dolly as defined in claim 1 wherein:

said wheel assembly comprising two separate wheels, there being two separate series of said first short pins and two separate series of said second short pins, a said series of said first short pins is to be in continuous engagement with a said series of said second short pins.

4. The collapsible dolly as defined in claim 1 wherein:

said wheel assembly comprising two separate wheels, when in said folded position a portion of said separate wheels extend sufficiently below said support frame to permit said separate wheels to rotate when moved against a supporting surface so that said dolly in said stowage position is easily wheelable by a human without carrying it.

5. The collapsible dolly as defined in claim 2 including:

stop means for limiting the extent of movement of said handle unit from said retracted position to said extended position, said stop means being located internally of said handle unit said stop means including an elongated member having a bottom end and a top end, said bottom end being fixed relative to said support frame, said top end including an abutment, said handle unit being slidably mounted on said elongated member, said handle unit to contact said abutment when said handle unit is in said extended position, whereby said abutment prevents said handle unit from separating from said support frame.

6. The collapsible dolly as defined in claim 2 wherein:

said wheel assembly comprising two separate wheels, there being two separate series of said first short pins and two separate series of said second short pins, a said series of said first short pins is to be in continuous engagement with a said series of said second short pins.

7. The collapsible dolly as defined in claim 6 wherein:

stop means for limiting the extent of movement of said handle unit from said retracted position to said extended position, said stop means being located internally of said handle unit, said stop means including an elongated member having a bottom end and a top end, said bottom end being fixed relative to said support frame, said top end including an abutment, said handle unit being slidably mounted on said elongated member, said handle unit to contact said abutment when said handle unit is in said extended position, whereby said abutment prevents said handle unit from separating from said support frame.

8. The collapsible dolly as defined in claim 1 wherein:

lock means connecting said platform to said support frame when said platform is in said stowage position.

9. A collapsible dolly comprising:

a support frame defining a plane, said support frame having a lower end and an upper end;

a wheel assembly mounted on said support frame at said lower end, said wheel assembly being pivotally movable between a folded position and a usage position, said folded position being in juxtaposition with said plane, said usage position being located transverse to said plane;

a platform mounted on said support frame at said lower end, said platform being pivotable between an loading position and a stowage position, said loading position being adapted to support an exterior weight, said loading position locating said platform transverse to said plane, said stowage position locating said platform parallel to said plane; and a cable assembly connecting said wheel assembly and said platform, said cable assembly being non-stretchable, whereby during movement of said platform from said loading position to said stowage position said wheel assembly is automatically moved by said cable assembly from said usage position to said folded position.

10. A collapsible dolly comprising:

a support frame defining a plane, said support frame having a lower end and an upper end;

a wheel assembly mounted on said support frame at said lower end, said wheel assembly being pivotally movable between a folded position and a usage position, said folded position being in juxtaposition with said plane, said usage position being located transverse to said plane;

a platform mounted on said support frame at said lower end, said platform being pivotable between an loading position and a stowage position, said loading position being adapted to support an exterior weight, said loading position locating said platform transverse to said plane, said stowage position locating said platform parallel to said plane;

a cable assembly connecting said wheel assembly and said platform, whereby during movement of said platform from said loading position to said stowage position said wheel assembly is automatically moved by said cable assembly from said usage position to said folded position; and said wheel assembly comprising two separate wheels, said cable assembly comprising two separate cables, there being a single said cable for each said wheel with both said cables only being connected together through the connection of said cables to said platform.

11. A collapsible dolly comprising:

a support frame defining a plane, said support frame having a lower end and an upper end;

a wheel assembly mounted on said support frame at said lower end, said wheel assembly being pivotally movable between a folded position and a usage position, said folded position being in juxtaposition with said plane, said usage position being located transverse to said plane;

a platform mounted on said support frame at said lower end, said platform being pivotable between an loading position and a stowage position, said loading position being adapted to support an exterior weight, said loading position locating said platform transverse to said plane, said stowage position locating said platform parallel to said plane;

a cable assembly connecting said wheel assembly and said platform, whereby during movement of said platform from said loading position to said stowage position said wheel assembly is automatically moved by said cable assembly from said usage position to said folded position and;

a handle unit mounted on said support frame at said upper end, said handle unit being telescopically movable relative to said support frame between an extended position and a retracted position, lock means to fix said handle unit to said support frame when said handle unit is in said extended position or in said retracted position, a single actuation device to cause said lock means to be disengaged, actuation of said actuation device permits said handle unit to be moved between said retracted position and said extended position.

12. The collapsible dolly as defined in claim 11 wherein:

stop means for limiting the extent of movement of said handle unit from said retracted position to said extended position, said stop means being located internally of said handle unit, said stop means including an elongated member having a bottom end and a top end, said bottom end being fixed relative to said support frame, said top end including an abutment, said handle unit being slidably mounted on said elongated member, said handle unit to contact said abutment when said handle unit is in said extended position, whereby said abutment prevents said handle unit from separating from said support frame.

\* \* \* \* \*